United States Patent [19]

Edwards et al.

[11] Patent Number: 4,761,551
[45] Date of Patent: Aug. 2, 1988

[54] OPTICAL TRANSDUCER WITH MOVABLE FILTER

[75] Inventors: Roger A. Edwards; Peter T. Gardiner, both of Cheltenham, England

[73] Assignee: Smiths Industries Public Limited Company, London, England

[21] Appl. No.: 933,949

[22] Filed: Nov. 24, 1986

[30] Foreign Application Priority Data

Dec. 18, 1985 [GB] United Kingdom ............... 8531149

[51] Int. Cl.$^4$ ............................................. G02B 5/14
[52] U.S. Cl. ................................ 250/227; 250/226; 250/231 R
[58] Field of Search .............................. 250/226, 227; 340/347 P; 356/414, 416, 419, 418

[56] References Cited

U.S. PATENT DOCUMENTS

| | | |
|---|---|---|
| 4,281,245 | 7/1981 | Brogardh et al. ............... 250/227 |
| 4,334,152 | 6/1982 | Dakin et al. .................... 250/226 |
| 4,531,230 | 7/1985 | Brogardh ......................... 250/227 |
| 4,560,868 | 1/1983 | Brogardh et al. ............... 250/227 |
| 4,644,154 | 2/1987 | Brogardh et al. ............... 250/227 |
| 4,652,747 | 3/1987 | Ellis .................................. 250/226 |

FOREIGN PATENT DOCUMENTS 0095273 11/1983 European Pat. Off. .
2025608A 7/1983 United Kingdom .
2141541A 12/1984 United Kingdom .

Primary Examiner—Edward P. Westin
Assistant Examiner—Charles F. Wieland
Attorney, Agent, or Firm—Pollock, Vande Sande and Priddy

[57] ABSTRACT

An optical displacement transducer is supplied via a fibre-optic cable with broad band radiation from an LED driven at reduced power. The transducer has a movable plate one half of which is neutrally transparent and the other half of which is coated with a filter the transmission characteristic of which varies sharply in the band width of the LED. A second fibre-optic cable receives radiation passing through the plate and supplies it to two detectors that are responsive respectively to two different wavelengths. The relative outputs of the two detectors varies according to the proportion of radiation passing through the transparent and filtering regions of the plate. A comparator compares these outputs to indicate the position of the plate.

9 Claims, 2 Drawing Sheets

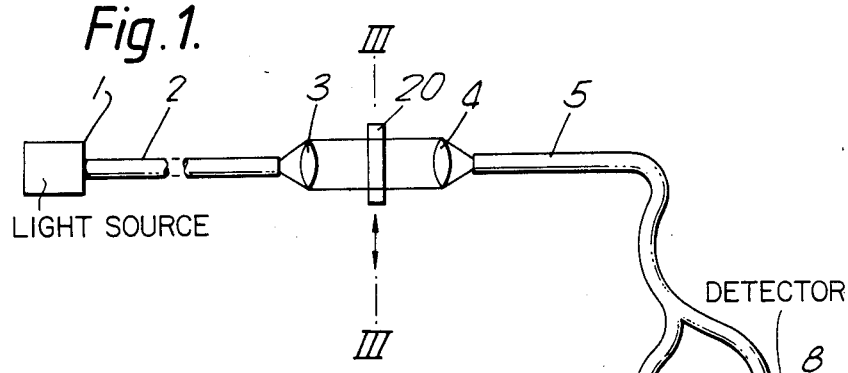
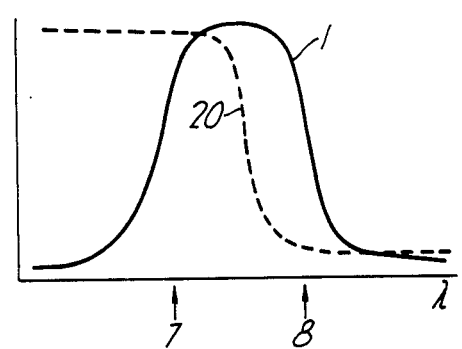
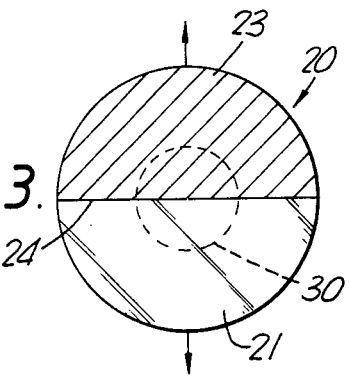
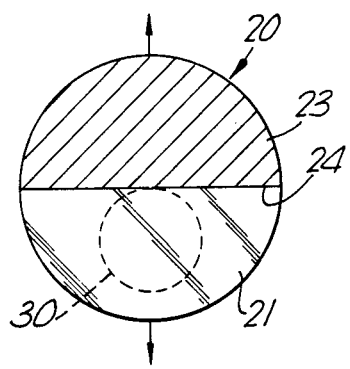
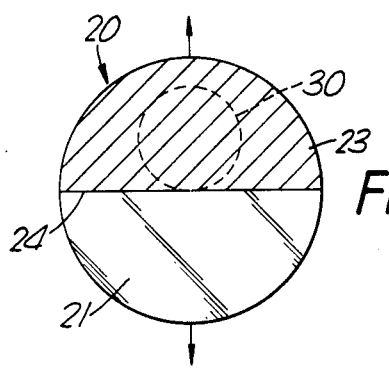

OPTICAL TRANSDUCER WITH MOVABLE FILTER

BACKGROUND OF THE INVENTION

This invention relates to optical transducers.

The invention is more particularly concerned with transducers for sensing displacement using optical means.

Optical displacement transducers, for example, are well known and generally employ a light source and receiver (such as provided by the ends of fibre-optic cables), and means to vary the amount of radiation falling on the receiver in accordance with displacement. The means by which the radiation is varied may employ a movable mask with an aperture of variable size, or a neutral density filter, the density of which varies along its direction of displacement. These transducers can function satisfactorily providing that the intensity of radiation falling on the receiver is not varied for any other reason. However, any change in the radiation emitted by the light source, such as, for example, caused by variations in power supply to the light source will produce erroneous displacement readings.

BRIEF SUMMARY OF THE INVENTION

It is an object of the present invention to provide an optical transducer that can be used to alleviate the above-mentioned problems.

According to one aspect of the present invention there is provided optical transducer apparatus including optical radiation source means adapted to emit radiation within a first band of wavelengths, optical detector means arranged to receive radiation from said source means, filter means having a transmission characteristic that is substantially constant over the area of the filter means and that various substantially within said first band of wavelengths, means for effecting displacement of the filter means relative to the path of radiation between the source means and the detector means such that the proportion of radiation incident on the detector means via the filter means to that incident directly on the detector means varies according to the position of the filter means, said detector means being arranged to provide outputs in respect of the quantity of radiation at two different wavelengths within said first band such that by comparison of the outputs at the two different wavelengths the position of the filter means relative to the radiation path can be determined.

The wavelengths over which the transmission characterist of the filter means varies substantially are preferably located substantially midway along said first band, the said two different wavelengths being located on oppoiste sides of said first band. The filter means may be provided by a part only of the area of a neutrally transparent substrate, the substrate being displaceable such that the boundary between the area that is neutrally transparent and the area that provides the filter means is moved into or out of the path of radiation between the source means and the detector means. The boundary may be a straight line. The detector means may include two separate detectors responsive to radiation at respective ones of said different wavelengths.

The optical transducer may include first fibre-optic cable means arranged to supply radiation from said source means to said filter means, and second fibre-optic cable means arranged to supply radiation from said filter means to said detector means. The said second fibre-optic cable means may be bifurcated at its end closer the detector means, and each bifurcation may extend to a respective detector.

The optical transducer apparatus may include comparator means arranged to receive the outputs from detector means in respect of the two different wavelengths. The optical transducer apparatus may include display means arranged to provide a display representation indicative of failure of the source means when the output of the detector means in respect of the wavelength which normally produces the higher output falls below a predetermined value.

The said optical radiation source is preferably provided by a single source which may be a light-emitting diode. The light-emitting diode is preferably driven at reduced power.

Optical displacement transducer apparatus in accordance with the present invention will now be described, by way of example, with reference to the accompanying drawings.

BRIEF DESCRIPTION OF THE DRAWINGS

FIG. 1 shows the apparatus schematically;

FIG. 2 is a graph showing an output characteristic of a light source in the apparatus, and a transmission characteristic of a filter in the apparatus;

FIG. 3 is a sectional view along the line III—III of FIG. 1 showing the filter in one position;

FIGS. 3A and 3B show the filter in its extreme positions;

DETAILED DESCRIPTION

Figure 4:
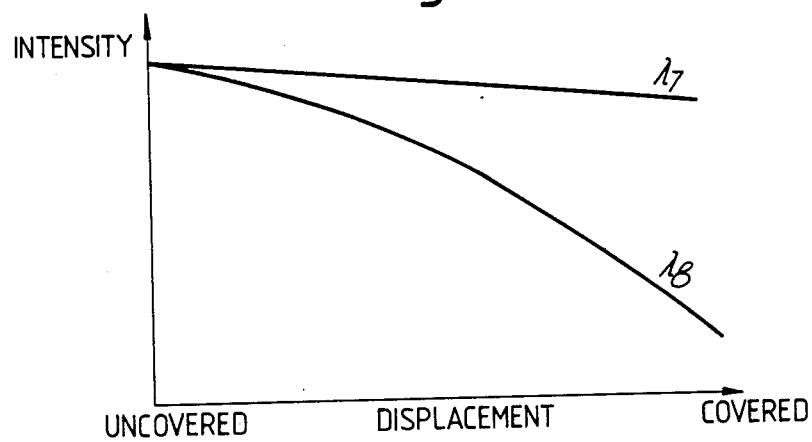
FIG. 4 is a graph showing how the output of detectors vary with displacement of the filter assembly.

With reference first to FIG. 1, the transducer apparatus includes a light source 1 that supplies optical radiation (which may be visible, infra red or ultra violet) to one end of a fibre-optic cable 2. The other end of the cable 2 terminates in front of a collimating lens 3 that produces a substantially parallel beam of radiation that is incident on a similar lens 4 located in front of the end of a second fibre-optic cable 5. A filter assembly 20 is located in the beam of radiation between the two lenses 3 and 4 and is displaceable in a direction transverse to the beam.

Radiation from the other end of the second cable 5 is supplied to two separate radiation detectors 7 and 8. This may be achieved by the biturcated cable shown or by other conventional optical means. The detectors 7 and 8 are each responsive to different wavelengths $\lambda_7$ and $\lambda_8$ respectively; their outputs are taken as an electrical signal to a comparator unit 9 which provides an output to an indicator display or other utilization means 10.

Referring now also to FIGS. 2 and 3, the output response of the light source 1 is shown in FIG. 2, by the continuous line, as a relatively broad band emission characteristic. The transmission characteristic of the filtering part of the assembly 20 is represented by the broken line; this will be seen to have a steep, rapidly changing transmission characteristic in the region of the peak emission by the light source 1. The peak responses of the two light detectors 7 and 8 are represented by the two arrows along the abscissa. These are spaced from one another on opposite sides of the emission peak of the light source 1 and of the slope of the transmission characteristic of the filter 20.

The filter assembly 20 is of circular shape, as seen in FIG. 3, although it can be of any other shape, and comprises a glass plate 21, or other transparent substrate, which has a filter coating 23 on one half. The other half of the plate 21 is preferably neutrally transparent, only the coated region 23 having the transmission characteristic shown in FIG. 2. The boundary 24 between the coated and uncoated regions is a straight line. The filter assembly 20 is displaceable transversely to the light beam, and to the boundary 24, between the positions shown in FIGS. 3A and 3B through that shown in FIG. 3. In FIGS. 3, 3A and 3B the section of the light beam is represented by the broken circle 30. In one extreme, shown in FIG. 3A, the light beam passes entirely through the transparent region of the filter assembly 20, while in the other extreme of displacement, shown in FIG. 3B, the light beam passes entirely through the region 23 coated with the filter material. At displacements between these two extremes varying portions of the beam are filtered and unfiltered.

Turning back to the curves shown in FIG. 2 and to the graph shown in FIG. 4, it will be clear that there will be very little change of attenuation in the intensity of radiation reaching the detector 7 upon displacement of the filter assembly 20, because the peak response of the detector 7 lies in a high transmission region of the filter. Because, however, the peak response of the other detector 8 lies in a low transmission region of the filter, the intensity of radiation reaching it will vary to a greater extent according to what portion of the light beam passes through the filtering region 23 of the assembly 20. FIG. 4 shows the difference between the intensity of radiation received at the two different wavelengths $\lambda_7$ and $\lambda_8$ for different positions of the filter assembly. The outputs from the two detectors 7 and 8 will therefore be substantially identical in the position shown in FIG. 3A but will be substantially different in the position shown in FIG. 3B.

The comparator unit 9 responds to the ratio of the outputs of the two detectors 7 and 8 and, after appropriate scaling or model matching, produces an output to the display 10 representative of the position of the filter assembly 20.

The light source 1 may be a light-emitting diode and is preferably driven at a reduced current such that marginal fluctuations in current do not substantially alter the wavelength characteristic of its output. Only one light source is needed, in contrast to some prior arrangements which can be susceptible to errors caused by differential changes in output of two sources. Because the present apparatus depends for displacement measurement on relative intensities of radiation at different wavelenghts, changes in either current supply, operation of the light source, or transmission of the fibre-optic cables will affect the intensities at the two wavelengths by substantially equal proportions, thus having little effect on the ratio. This contrasts with apparatus relying on, for example, displacement of a graduated neutral density filter, since such apparatus will be susceptible to amplitude variations resulting from any other cause.

In previous apparatus, where one extreme of displacement results in a zero or substantially zero intensity output from the detector, it may not be possible to distinguish between such an extreme displacement and failure of the light source. In the present apparatus, however, because the intensity of radiation received by one detector 7 does not vary substantially with displacement, the output of that detector is normally higher. It is therefore possible to monitor for a source failure by monitoring the output of that detector and indicating failure on the display 10 when that output falls below a predetermined value.

The apparatus may be used to measure the displacement or position of an object directly, by coupling the filter assembly to the object, which may be via gearing or linkage. Alternatively, the apparatus may be used to measure other variables. For example, pressure can be measured by coupling the filter assembly to a Bourdon tube or a diaphragm. Temperature could be measured by coupling the filter assembly to an expansible member, such as a bimetallic strip.

Figure 5:
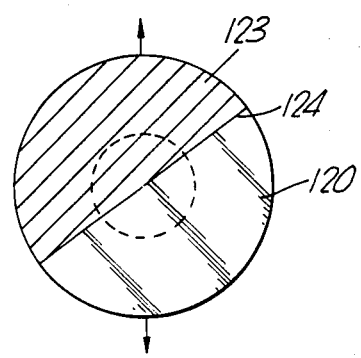
FIGS. 5 and 6 show alternative filter assemblies.
Figure 6:
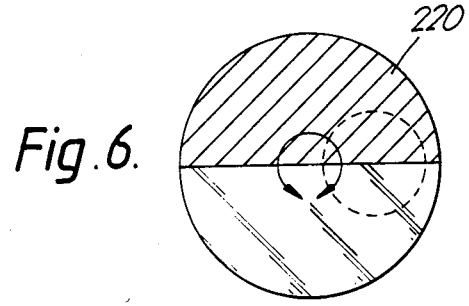

The filter assembly 20 could take other forms such as shown in FIGS. 5 and 6. In FIG. 5, the boundary 124 between the coated region 123 and the uncoated region of the assembly 120 is a straight line that is inclined to the axis of displacement of the filter: this allows a greater travel for the assembly 120 between its two extremes of position. The boundary between the coated and uncoated regions could have other profiles and, for example, may be stepped or curved, to give the desired output relationship. FIG. 6 shows a rotatable filter assembly 220, the light beam being attenuated to a degree according to the angle of the assembly.

It may not be necessary to use two separate detectors to detect radiation at the two different wavelengths. Instead, for example, a single detector comprising a stack of two photodiodes, may be used. The top photodiode provides an output of the intensity at one wavelength peak and transmits radiation at the other wavelength to an underlying photodiode which is responsive to radiation at that wavelength.

The output from the comparator 9 may be supplied to some form of utilization means other than a display. For example, if the filter assembly is displaced by temperature, the utilization means may be a temperature control unit. Many other forms of utilization means can be used.

What we claim is:

1. Optical transducer apparatus comprising: a single optical radiation source means, said source means being adapted to emit radiation along a path within a first band of wavelengths; filter means having a transmission characteristic at any point on said filter means that is substantially the same as the transmission characteristic at other points on the filter means, the transmission characteristic at any said point varying substantially within said first band of wavelenghts; means for effecting displacement of the said filter means relative to said path of radiation from said source means; detector means located in said path to receive only radiation from said source means, the radiation being received by said detector means both directly from said source means and via the filter means in amounts that both vary according to the position of said filter means, said detector means being arranged to provide outputs in respect of the quantity of radiation at two different wavelengths spaced from one another within said first band; and means for comparing the outputs of the detector means at said two different wavelengths so as thereby to determine the position of the filter means, said source means being operative to emit a substantially constant radiation level and spectral content regardless of changes in the level of radiation received by said detector means.

2. Optical transducer apparatus according to claim 1, wherein the wavelengths over which the transmission characteristic of the said filter means varies substantially are located substantially midway along said first band, said two different wavelengths being located on opposite sides of said first band.

3. Optical transducer apparatus according to claim 1, including a neutrally transparent substrate, said filter means being provided on a part only of the area of said substrate to define a boundary between an area that is neutrally transparent and the area that provides said filter means, and wherein the said means for effecting displacement of the said filter means moves the said boundary into or out of the said path of radiation.

4. Optical transducer apparatus according to claim 3, wherein the said boundary is a straight line.

5. Optical transducer apparatus according to claim 1, wherein the said detector means includes two separate detector, which are responsive respectively to radiation as respective ones of said two different wavelengths.

6. Optical transducers apparatus according to claim 1, including first fibre-optic cable means, arranged to supply radiation from said source means to said filter means, and second fibre-optic cable means arranged to supply radiation from said filter means to said detector means.

7. Optical transducer apparatus according to claim 6 wherein the said detector means includes two separate detectors which are responsive respectively to radiation at respective ones of said two different wavelengths, the said second fibre-optic cable means being bifurcated at the end thereof which is closer to said detector means, and each bifurcation extending to a respective detector.

8. Optical transducer apparatus according to claim 1, wherein the said comparing means is responsive to a fall below a predetermined level in that output in respect of the wavelength which normally produces the higher of the two outputs, and wherein the transducer apparatus includes display means, said display means providing a display representation indicative of failure of said source means in response to a said fall in the said output below said predetermined level.

9. Optical transducer apparatus according to claim 1, wherein the said source means is a light-emitting diode driven at reduced power.

* * * * *